United States Patent
Rice et al.

(10) Patent No.: US 8,899,051 B2
(45) Date of Patent: Dec. 2, 2014

(54) GAS TURBINE ENGINE FLANGE ASSEMBLY INCLUDING FLOW CIRCUIT

(75) Inventors: Edward Claude Rice, Indianapolis, IN (US); Naveen Rau, Zionsville, IN (US); Robert C Koth, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 464 days.

(21) Appl. No.: 13/337,111

(22) Filed: Dec. 24, 2011

(65) Prior Publication Data

US 2012/0192567 A1    Aug. 2, 2012

Related U.S. Application Data

(60) Provisional application No. 61/428,765, filed on Dec. 30, 2010.

(51) Int. Cl.
| | |
|---|---|
| F02C 7/20 | (2006.01) |
| F01D 25/24 | (2006.01) |
| F01D 25/12 | (2006.01) |
| F01D 25/14 | (2006.01) |

(52) U.S. Cl.
CPC .............. *F01D 25/243* (2013.01); *F01D 25/12* (2013.01); *F01D 25/14* (2013.01); *F01D 25/246* (2013.01); *Y02T 50/675* (2013.01); *F05D 2260/202* (2013.01)
USPC .............................................. 60/796; 60/806

(58) Field of Classification Search
USPC ............... 60/751–760, 806, 796, 761–766; 415/115–117
See application file for complete search history.

(56) References Cited

U.S. PATENT DOCUMENTS

| | | | |
|---|---|---|---|
| 3,854,285 A * | 12/1974 | Stenger et al. ................... | 60/756 |
| 4,614,082 A * | 9/1986 | Sterman et al. .................. | 60/796 |
| 4,785,623 A | 11/1988 | Reynolds | |
| 4,912,922 A | 4/1990 | Maclin | |
| 5,167,485 A | 12/1992 | Starkweather | |
| 5,219,268 A | 6/1993 | Johnson | |
| 5,524,430 A | 6/1996 | Mazeaud et al. | |
| 5,593,277 A * | 1/1997 | Proctor et al. ............. | 415/173.1 |
| 5,701,733 A | 12/1997 | Lewis et al. | |
| 5,755,556 A * | 5/1998 | Hultgren et al. ............ | 416/96 R |
| 6,227,575 B1 | 5/2001 | Monning et al. | |
| 6,352,404 B1 | 3/2002 | Czachor et al. | |
| 6,401,447 B1 | 6/2002 | Rice et al. | |

(Continued)

FOREIGN PATENT DOCUMENTS

| | | |
|---|---|---|
| DE | 4324035 A1 | 1/1995 |
| EP | 1566524 A2 | 8/2005 |

OTHER PUBLICATIONS

Extended European Search Report in corresponding European application (i.e., EP11250946.8), mailed Feb. 18, 2014 (8 pages).

*Primary Examiner* — Phutthiwat Wongwian
(74) *Attorney, Agent, or Firm* — Krieg DeVault LLP (57) ABSTRACT

The disclosure is directed to a unique apparatus having a gas turbine engine flange assembly. Also disclosed is a unique system having a gas turbine engine flange assembly in which a fluid flow circuit is provided. Also disclosed are apparatuses, systems, devices, hardware, methods, and combinations for gas turbine engine flange assemblies, in which a fluid flow circuit extends between flanges or from a cavity within a turbine engine case to an interior portion of a flange assembly.

14 Claims, 5 Drawing Sheets

(56) References Cited

U.S. PATENT DOCUMENTS

| | | |
|---|---|---|
| 6,860,108 B2 | 3/2005 | Soechting et al. |
| 7,000,406 B2 | 2/2006 | Markarian et al. |
| 7,036,316 B2 | 5/2006 | Howell et al. |
| 8,147,178 B2 * | 4/2012 | Ottaviano et al. ............ 415/104 |
| 2001/0035003 A1 | 11/2001 | Sinha et al. |
| 2001/0046651 A1 | 11/2001 | Steber et al. |
| 2002/0069644 A1 | 6/2002 | Stuttaford et al. |
| 2003/0066292 A1 | 4/2003 | Mack et al. |
| 2004/0134199 A1 | 7/2004 | Manteiga et al. |
| 2004/0139746 A1 | 7/2004 | Soechting et al. |
| 2004/0250548 A1 | 12/2004 | Howell et al. |
| 2004/0261419 A1 | 12/2004 | McCaffrey et al. |
| 2005/0000226 A1 | 1/2005 | McCaffrey et al. |
| 2005/0000227 A1 | 1/2005 | McCaffrey et al. |
| 2006/0042253 A1 | 3/2006 | Fortuna et al. |
| 2006/0162314 A1 | 7/2006 | Youngblood |
| 2008/0236170 A1 | 10/2008 | Weaver et al. |

\* cited by examiner

GAS TURBINE ENGINE FLANGE ASSEMBLY INCLUDING FLOW CIRCUIT

CROSS REFERENCE TO RELATED APPLICATIONS

The present application claims benefit of U.S. Provisional Patent Application No. 61/428,765, filed Dec. 30, 2010, entitled GAS TURBINE ENGINE FLANGE ASSEMBLY INCLUDING FLOW CIRCUIT, which is incorporated herein by reference.

FIELD OF THE INVENTION

The present invention relates generally to gas turbine engines and more particularly, but not exclusively, to gas turbine engine flange assemblies having flow circuits therein.

BACKGROUND

Gas turbine engines are an efficient source of useful energy and have proven useful to propel and power aircraft, for electricity generation, as well as for other uses. Gas turbine engines include a number of structures which must be interconnected. Present approaches to interconnection of gas turbine engine structures suffer from a number of disadvantages, limitations, and drawbacks, for example, those respecting weight, mass, complexity, thermal stress, thermal mismatch, ease of assembly or disassembly, part count, engine envelope, engine profile, and others. Thus, there is a need for unique and inventive apparatuses, systems, and methods of interconnecting gas turbine engine structures.

SUMMARY

One embodiment is a unique apparatus having a gas turbine engine flange assembly. Another embodiment is a unique system having a gas turbine engine flange assembly. Still other embodiments include apparatuses, systems, devices, hardware, methods, and combinations for gas turbine engine flange assemblies. Further embodiments, forms, objects, features, advantages, aspects, embodiments and benefits shall become apparent from the following descriptions, drawings, and claims.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
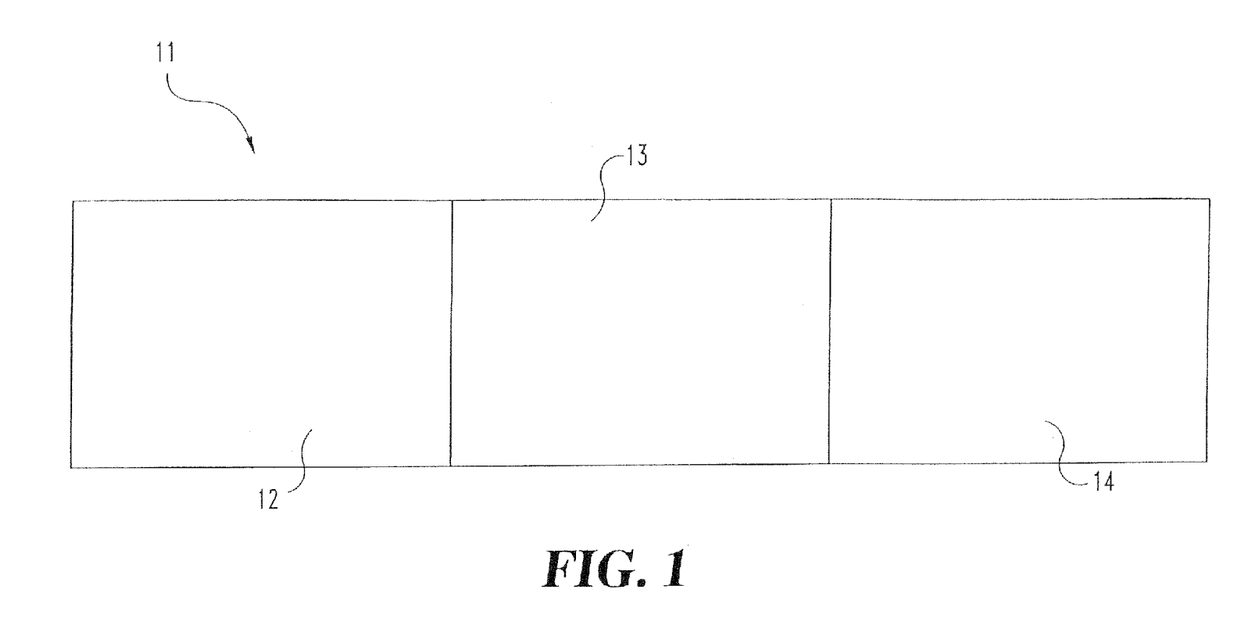
FIG. 1 is a generalized schematic representation illustrating some aspects of a non-limiting example of a gas turbine engine in accordance with an embodiment of the present invention.

With reference to FIG. 1, there is illustrated some aspects of a non-limiting example of a generalized representation of a gas turbine engine 11 in accordance with an embodiment of the present invention. Gas turbine engine 11 includes a compressor section 12, a combustor section 13, and a turbine section 14, which are integrated together. It is important to realize that there are multitudes of ways in which gas turbine engine components can be linked together. In one form, gas turbine engine components are integrated to produce an aircraft flight propulsion engine generally referred to as a turbofan. Another form of a gas turbine engine includes a compressor section, a combustor section, and a turbine section integrated to produce an aircraft flight propulsion engine without a fan section. It should be understood that the present invention is applicable to all types of gas turbine engines, and is not limited to the embodiments illustrated and described herein. Embodiments of the present invention may be employed, for example and without limitation, in gas turbine engines that are configured for use in other applications, such as pumping sets for gas and oil transmission lines, electricity generation, naval propulsion and/or power generation, vehicle propulsion and auxiliary power units. It is also important to realize that there are a multitude of additional components which can be used in gas turbine engines. For example, additional compressor and turbine stages could be present with intercoolers connected between the compressor stages.

Figure 2:
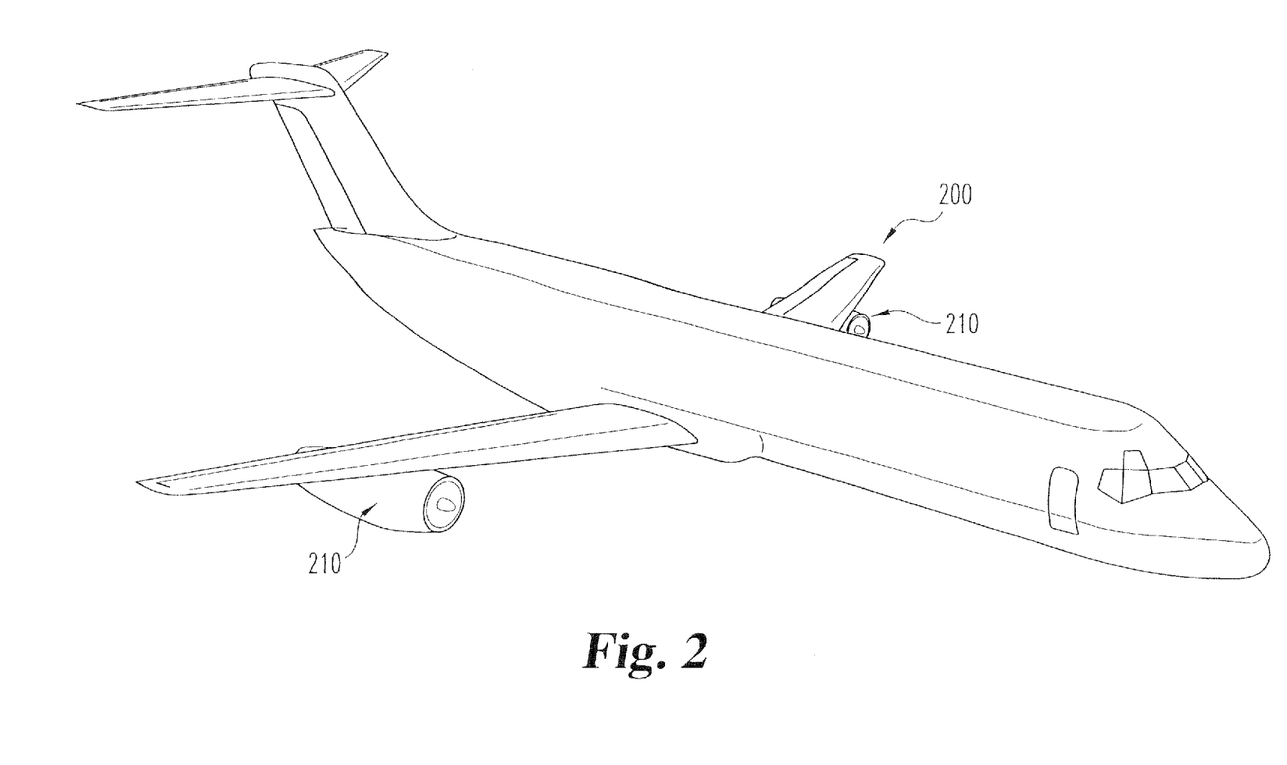
FIG. 2 is a perspective view of an aircraft including gas turbine engines configured for aircraft propulsion.

With reference to FIG. 2 there is illustrated an aircraft 200 including gas turbine engines 210 which are configured for aircraft propulsion. It should be understood that the term "aircraft" includes helicopters, airplanes, missiles, unmanned space devices, transatmospheric vehicles and other substantially similar devices.

Figure 3:
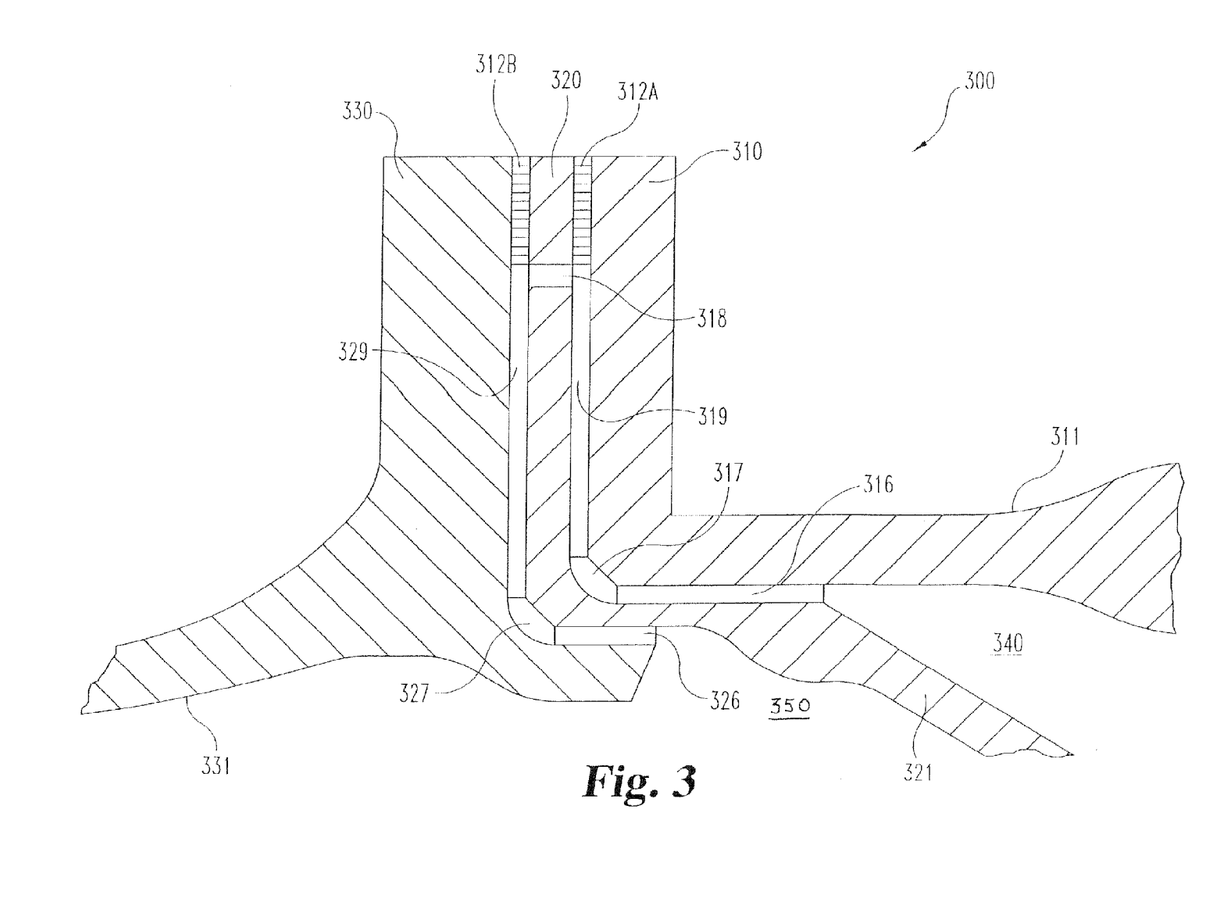
FIG. 3 is a side sectional view illustrating some aspects of a non-limiting example of a flange assembly in accordance with an embodiment of the present invention.

With reference to FIG. 3, there is illustrated a side sectional view illustrating some aspects of a non-limiting example of a gas turbine engine flange assembly 300 in accordance with an embodiment of the present invention. Flange assembly 300 includes a flange 310, a flange 320, and a flange 330. Flange 320 is positioned intermediate (between) the flange 310 and the flange 330. Flange 310 extends from case 311, flange 320 extends from support 321, and flange 330 extends from case 331. A shim plate 312A is positioned intermediate flange 310 and flange 320. A shim plate 312B is positioned intermediate flange 320 and flange 330. Further embodiments may include additional shim plates or may omit one or both of shim plates 312A and 312B.

In the embodiment illustrated in FIG. 3, case 311 is an outer combustor case, support 321 is a diffuser support, and case 331 is a compressor case. in other embodiments, case 311, support 321 and case 331 may represent other engine 11 components, e.g., cases and/or supports. For example in another exemplary embodiment, flange 330 extends from case 331 in the form of an outer combustor case, flange 320 extends from support 321 in the form of a turbine support, flange 310 extends from case 311 in the form of a turbine case, and flange 320 is positioned intermediate flange 330 and flange 310. In a further exemplary embodiment, flange 330 extends from case 331 in the form of a turbine case, flange 320 extends from support 321 in the form of a turbine support or an afterburner support, flange 310 extends from case 311 in the form of an afterburner case, and flange 320 is positioned intermediate flange 330 and flange 310. In further exemplary embodiments, a flange positioned intermediate inner and outer flanges may be independent of a case or support and may be present primarily or exclusively to help define a flow circuit in a flange assembly. Further embodiments include flanges which are fastened to or coupled to cases, supports and/or other structure(s). Additional embodiments contemplate assemblies including a flange positioned adjacent at least one other flange where the flanges extend from or are coupled to other gas turbine cases, supports, or other structures.

With continuing reference to FIG. 3, a higher pressure cavity 340 is bordered by case 311 and support 321, and a lower pressure cavity 350, having a low pressure than high pressure cavity 340, is bordered by support 321 and case 331. It should be understood that additional structure(s) may also border higher pressure cavity 340 and lower pressure cavity 350. In the embodiment illustrated in FIG. 3, higher pressure cavity 340 is a bleed air cavity which contains pressurized working fluid received from a gas turbine engine compressor, and lower pressure cavity 350 contains fluid at a lower pressure than higher pressure cavity 340. Other embodiments contemplate other higher pressure cavities, for example, bypass cavities, or other cavities which receive working fluid from a compressor or from other gas turbine engine sections or stages, and other lower pressure cavities which contain fluid at a lower pressure than their respective higher pressure cavities.

A flow circuit interconnects higher pressure cavity 340 and lower pressure cavity 350 and provides a route for fluid to flow through flange assembly 300. A pressure differential between higher pressure cavity 340 and lower pressure cavity 350 causes fluid to flow through the flow circuit. From higher pressure cavity 340, fluid flow enters recess 316 and proceeds to fillet cavity 317. From fillet cavity 317 fluid flow proceeds to passage 319. From passage 319 fluid flow proceeds to hole 318 which is provided in flange 320. From hole 318 fluid flow proceeds to passage 329. From passage 329, fluid flow proceeds to fillet cavity 327. From fillet cavity 327, fluid flow proceeds to recess 326. From recess 326, fluid flow proceeds to lower pressure cavity 350. Recess 316 is defined in flange 320 and faces flange 310. In other embodiments, recess 316 can be defined in flange 310 facing flange 320. Recess 326 is defined in flange 320 and faces flange 330. In other embodiments, recess 326 can be defined in flange 330 facing flange 320. In the illustrated embodiment, passages 319 and 329 are provided by shim plates 312A and 312B, respectively. In other embodiments, passages 319 and/or 329 can be provided in flanges 310, 320, and/or 330, for example, using machining techniques.

Figure 4:
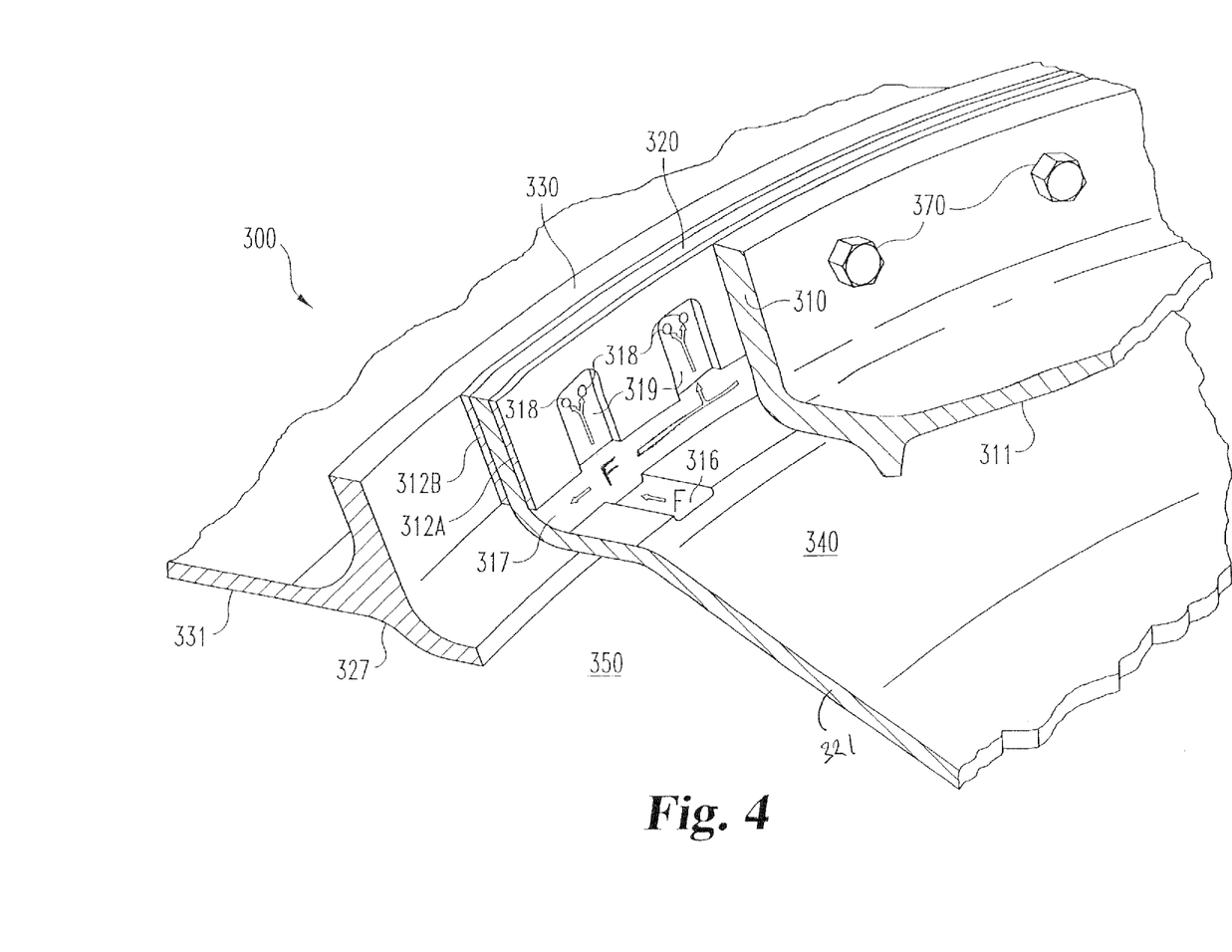
FIG. 4 is a perspective sectional view illustrating some aspects of the flange assembly of FIG. 3.

With reference to FIG. 4, there is illustrated a perspective sectional view of some aspects of a non-limiting example of flange assembly 300 in accordance with an embodiment of the present invention. While only a portion of flange assembly 300 is illustrated in FIG. 4, it is contemplated that flange assembly 300 could extend about all or a portion of the circumference of cases 311 and 331. Features described above in connection with FIG. 3 are indicated with identical reference numerals in FIG. 4. Fasteners 370 may pass through flanges 310, 320 and 330 and shim plates 312A and 312B to fasten the flange assembly 300 together. Additional embodiments contemplate other means for fastening flange assembly 300 including welding, other fasteners, and/or combinations of these and other techniques.

As illustrated by arrows F, fluid flow from higher pressure cavity 340 enters recess 316 and proceeds to fillet cavity 317 which extends along the entire circumference of flange assembly 300. In other embodiments, fillet cavity 317 can extend along only a portion of the circumference of flange assembly 300. In other embodiments, a number of fillet cavities can extend along portions of the circumference of flange assembly 300. Flow can proceed in either direction along fillet cavity 317 and into passage 319 opposite recess 316. The number of recesses 316 provided in flange assembly 300 may vary, e.g., depending upon the desired amount of flow through flange assembly 300. As illustrated in FIG. 4, there are a number of passages 319 provided in flange assembly 300. Furthermore, there may also be additional recesses similar to recess 316 provided in flange assembly 300. From passages 319, flow proceeds through holes 318 provided in flange 320. In the embodiment illustrated in FIG. 4, two holes 318 are positioned near the distal corners of the passage 319. This position provides a preferred fluid flow through passage 319. Other embodiments contemplate different numbers and positioning of holes, for example, one, three, four or more holes could be provided in a variety of positions. Further embodiments contemplate that the holes could be a variety of different shapes, for example, ellipsoid shapes, slots, and other openings could be provided in flange 320. Additional embodiments contemplate that a variety of different sizes of holes or other openings could be provided in flange 320, for example, larger openings, smaller openings, and combinations of different sizes of openings. Further embodiments contemplate that flow across flange 320 could proceed around an end of flange 320 rather than through one or more openings provided through flange 320. In such embodiments flange 320 may extend radially along only part of flanges 310 and 330 and one or more flow paths could be positioned at an end of flange 320. An additional structure could be positioned intermediate flanges 310 and 330 to define one or more flow paths positioned at the end of flange 320. Alternatively, a portion of flange 310, flange 330, or both could extend to define the flow path(s) positioned at the end of flange 320.

Figure 5:
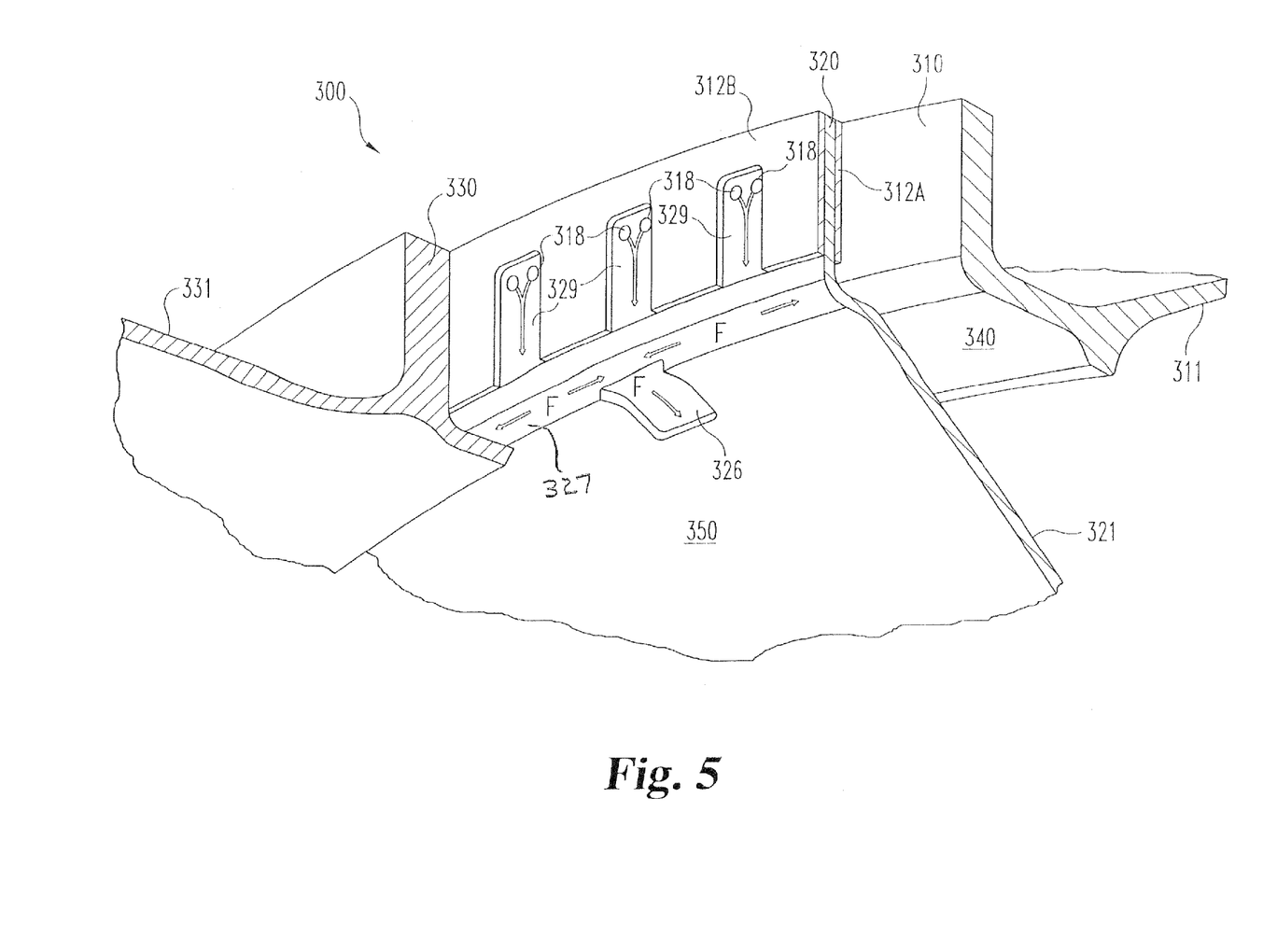
FIG. 5 is a perspective sectional view illustrating some aspects of the flange assembly of FIG. 3.

With reference to FIG. 5, there is illustrated a perspective view of some aspects of a non-limiting example of a portion of flange assembly 300 in accordance with an embodiment of the present invention. While only a portion of flange assembly 300 is illustrated in FIG. 5, it is contemplated that flange assembly 300 could extend about all or a portion of the circumference of cases 311 and 331. Features described above in connection with FIGS. 3 and 4 are indicated with identical reference numerals in FIG. 5. Arrows F illustrate the flow of fluid through flange assembly 300. As indicated by arrows F, fluid flows from holes 318 into passages 329. From passages 329, fluid flow enters fillet cavity 327 which extends along the circumference of flange assembly 300. In other embodiments, fillet cavity 327 can extend along a portion of the circumference of flange assembly 300. In other embodiments, a number of fillet cavities can extends along portions of the circumference of flange assembly 300. From fillet cavity 327, fluid flow can proceed in either direction along fillet cavity 327, or can enter recess 326. From recess 326, flow enters lower pressure cavity 350. The number of recesses 326 provided in flange assembly 300 may vary, e.g., depending upon the desired amount of flow through flange assembly 300. Recesses 316 and 326 and passages 319 and 329 are preferably intermittently spaced so that they do not interfere with the piloting provided by flanges 310, 320 and 330.

In a preferred embodiment, the flow circuit of flange assembly 300 can provide desirable thermal response. During engine operation outer combustor case 311 is subjected to high temperatures resulting from the combustion process in the combustor section of a gas turbine engine. The flange assembly 300 is subjected to the relatively lower temperature of its environment. A temperature mismatch between the case 311 and the flange assembly 300 can result and may produce undesirable thermally induced stress. Flow through the flow circuit provided in flange assembly 300 can increase the thermal response of the flange assembly and decrease the temperature mismatch and thermally induce stress that might otherwise be present.

Embodiments of the present invention include an apparatus comprising: a gas turbine engine flange assembly including: a first flange, a second flange, and a third flange, the second flange being positioned intermediate the first flange and the third flange; and a fluid flow circuit extending intermediate the first flange and the second flange, across the second flange, and intermediate the second flange and the third flange.

In a refinement, the apparatus further comprises a shim plate positioned intermediate the first flange and the second flange.

In another refinement, the apparatus further comprises a shim plate positioned intermediate the second flange and the third flange, the shim plate defining a boundary of a portion of the fluid flow circuit.

In yet another refinement, the apparatus further comprises a fillet cavity intermediate the first flange and the second flange.

In still another refinement, the apparatus further comprises a fillet cavity intermediate the second flange and the third flange, the fillet cavity defining a boundary of a portion of the fluid flow circuit.

In yet still another refinement, the apparatus further comprises a recess provided in one of the first flange, the second flange, and the third flange, the recess defining a boundary of a portion of the fluid flow circuit.

In an additional refinement, the apparatus further comprises means for routing fluid flow through the flange assembly.

In a further refinement, the flow circuit extends from a higher pressure cavity to a lower pressure cavity and includes a first recess provided in the second flange, a first fillet cavity intermediate the first flange and the second flange, a first passage bordered by first a shim plate, the first flange and the second flange, at least one opening provided in the second flange, a second passage bordered by a second shim plate, the second flange and the third flange, a second fillet cavity intermediate the second flange and the third flange, and a second recess provided in the second flange.

In a yet further refinement, the first flange extends from a compressor case, and the third flange extends from an outer combustor case.

In a still further refinement, the first flange extends from an outer combustor case, and the third flange extends from a turbine case.

In a yet still further refinement, the first flange extends from a combustor case, and the third flange extends from an afterburner case.

In another further refinement, the second flange extends from a support.

Embodiments of the present invention include a system comprising: a first gas turbine engine case; a second gas turbine engine case; a flange assembly coupling the first gas turbine engine case and the second gas turbine engine case, the flange assembly extending circumferentially about at least a portion of the first gas turbine engine case; and a fluid flow circuit extending from a cavity within the first gas turbine engine case to an interior portion of the flange assembly.

In a refinement, the flange assembly includes a first flange, a second flange, and a third flange, the second flange being positioned intermediate the first flange and the third flange.

In another refinement, the fluid flow circuit extends from a higher pressure cavity to a lower pressure cavity and includes a first flow passage intermediate the first flange and the second flange, an opening provided in the second flange, and a second flow passage intermediate the second flange and the third flange.

In yet another refinement, the first gas turbine engine case is a combustor case and the second gas turbine engine case is a compressor case.

In still another refinement, the first gas turbine engine case is a combustor case and the second gas turbine engine case is a turbine case.

In yet still another refinement, the first gas turbine engine case is an afterburner case and the second gas turbine engine case is a turbine case.

Embodiments of the present invention include a method comprising: operating a gas turbine engine including a compressor, a combustor, a turbine, a flange assembly including a first flange extending from an engine case, a second flange, and a third flange; generating a temperature differential between a portion of the engine case and the flange assembly based upon the operating; and flowing fluid through a flow circuit in the flange assembly effective to reduce the temperature differential.

In a refinement, the flowing fluid through a flow circuit in the flange includes flowing fluid through a passage intermediate the first flange and the second flange.

In another refinement, the flowing fluid through a flow circuit in the flange includes flowing fluid through a hole provided in the second flange.

In yet another refinement, the engine case is an outer combustor case.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
a gas turbine engine flange assembly including:
a first flange,
a second flange, and
a third flange,
the second flange being positioned intermediate the first flange and the third flange; and
a fluid flow circuit extending intermediate the first flange and the second flange, across the second flange, and intermediate the second flange and the third flange;
wherein the fluid flow circuit includes a first flow passage intermediate the first flange and the second flange, at least one opening provided in the second flange, and a second flow passage intermediate the second flange and the third flange;

wherein the first flow passage is bordered by a first shim plate, the first flange and the second flange;

further comprising a second shim plate positioned intermediate the second flange and the third flange, the second shim plate defining a boundary of a portion of the fluid flow circuit.

2. The apparatus of claim 1, further comprising a fillet cavity intermediate the first flange and the second flange.

3. The apparatus of claim 1, further comprising a fillet cavity intermediate the second flange and the third flange, the fillet cavity defining a boundary of a portion of the fluid flow circuit.

4. The apparatus of claim 1, further comprising a recess provided in one of the first flange, the second flange, and the third flange, the recess defining a boundary of a portion of the fluid flow circuit.

5. The apparatus of claim 1, further comprising means for routing fluid flow through the flange assembly.

6. The apparatus of claim 1, wherein the flow circuit extends from a higher pressure cavity to a lower pressure cavity and includes a first recess provided in the second flange, a first fillet cavity intermediate the first flange and the second flange, the first flow passage the at least one opening provided in the second flange, the second flow passage, a second fillet cavity intermediate the second flange and the third flange, and a second recess provided in the second flange;

wherein the second flow passage is bordered by the second shim plate, the second flange and the third flange.

7. The apparatus of claim 1, wherein the first flange extends from a compressor case, and the third flange extends from an outer combustor case.

8. The apparatus of claim 1, wherein the first flange extends from an outer combustor case, and the third flange extends from a turbine case.

9. The apparatus of claim 1, wherein the first flange extends from a combustor case, and the third flange extends from an afterburner case.

10. The apparatus of claim 1, wherein the second flange extends from a support.

11. A system comprising:

a first gas turbine engine case;

a second gas turbine engine case;

a flange assembly coupling the first gas turbine engine case and the second gas turbine engine case, the flange assembly extending circumferentially about at least a portion of the first gas turbine engine case; and a fluid flow circuit extending from a cavity within the first gas turbine engine case to an interior portion of the flange assembly;

wherein the flange assembly includes a first flange, a second flange, and a third flange, the second flange being positioned intermediate the first flange and the third flange;

wherein the fluid flow circuit extends from a higher pressure cavity to a lower pressure cavity and includes a first flow passage intermediate the first flange and the second flange, an opening provided in the second flange, and a second flow passage intermediate the second flange and the third flange; and wherein the first flow passage is bordered by a first shim plate, the first flange and the second flange further comprising a second shim plate positioned intermediate the second flange and the third flange, the second shim plate defining a boundary of a portion of the fluid flow circuit.

12. The system of claim 11, wherein the first gas turbine engine case is a combustor case and the second gas turbine engine case is a compressor case.

13. The system of claim 11, wherein the first gas turbine engine case is a combustor case and the second gas turbine engine case is a turbine case.

14. The system of claim 11, wherein the first gas turbine engine case is an afterburner case and the second gas turbine engine case is a turbine case.

* * * * *